(12) United States Patent
Fast et al.

(10) Patent No.: US 9,820,609 B2
(45) Date of Patent: Nov. 21, 2017

(54) WAFFLE IRON PLATE

(75) Inventors: Brian J. Fast, Laguna Beach, CA (US); Ryan Adams, Santa Ana, CA (US)

(73) Assignee: THE FAST FAMILY TRUST, Laguna Beach, CA (US), dated July 27, 2009, Brian J. Fast and Julie A. Fast, trustees ( * ) Notice: Subject to any disclaimer, the term of this patent is extended or adjusted under 35 U.S.C. 154(b) by 372 days.

(21) Appl. No.: 13/543,725

(22) Filed: Jul. 6, 2012

(65) Prior Publication Data
US 2014/0007780 A1 Jan. 9, 2014

(51) Int. Cl.
*A47J 37/06* (2006.01)

(52) U.S. Cl.
CPC .................. *A47J 37/0611* (2013.01)

(58) Field of Classification Search
CPC ........ A47J 37/0611; A47J 27/60; A47J 27/62; A47J 36/02; A47J 36/38; A47J 37/04; A47J 37/06; A47J 37/067; A47J 37/0605; A47J 37/0623; A47J 37/0629; A47J 37/0676; A47J 2037/06; A47J 2037/0611; F24C 15/10
USPC ......... 99/331, 372–384, 353, 426, 427, 428, 99/430, 431, 432, 433, 439, 449, 450; 426/245, 389, 414, 502, 512; 249/92, 249/170–172, 185
See application file for complete search history.

(56) References Cited

U.S. PATENT DOCUMENTS

| | | | | |
|---|---|---|---|---|
| 246,194 A | * | 8/1881 | Patton .................. | A47J 37/0611 99/377 |
| 264,867 A | * | 9/1882 | Ege ...................... | A47J 37/0611 99/375 |
| 267,535 A | * | 11/1882 | Hurd .................... | A47J 37/0611 241/168 |
| 270,659 A | * | 1/1883 | Griswold et al. ..... | A47J 37/0611 99/374 |
| 270,973 A | * | 1/1883 | Newman ............... | A47J 37/0611 99/377 |
| 277,422 A | * | 5/1883 | Harker ................. | A47J 37/0611 99/377 |
| 287,713 A | * | 10/1883 | Patton .................. | A47J 37/0611 99/377 |
| 534,255 A | * | 2/1895 | Fleming ................ | A47J 37/041 99/340 |
| 1,314,602 A | * | 9/1919 | Miglietta ............... | A21B 5/026 292/153 |
| 1,493,444 A | * | 5/1924 | Burch .................. | A47J 37/0611 99/375 |
| 1,606,778 A | | 4/1925 | Yancey | |

(Continued)

FOREIGN PATENT DOCUMENTS

WO    WO 0150878 A2 *  7/2001  ............... A23G 9/00

OTHER PUBLICATIONS

Tidbits, Apr. 12, 2005, Time Magazine.*

(Continued)

*Primary Examiner* — Eric Stapleton
(74) *Attorney, Agent, or Firm* — Knobbe, Martens, Olson & Bear, LLP (57) ABSTRACT

A waffle iron plate for forming a waffle having multiple scores, the plate comprising a base having a front surface and at least two spaced-apart ribs extending from the front surface of the base and configured to form the scores, whereby the waffle may be folded along the scores so as to have a bottom portion and two side portions.

14 Claims, 6 Drawing Sheets

(56) References Cited

U.S. PATENT DOCUMENTS

| | | | | |
|---|---|---|---|---|
| 1,615,122 A | | 5/1925 | Gordon | |
| 1,553,989 A | * | 9/1925 | Cook | A47J 37/0611 99/375 |
| 1,596,652 A | * | 8/1926 | Giovannetti | A47J 37/1295 249/171 |
| 1,672,738 A | * | 6/1928 | Stampley | A47J 37/1295 99/411 |
| 1,708,499 A | * | 4/1929 | Filbey | A47J 37/0611 99/377 |
| 1,754,800 A | * | 4/1930 | Preston | A47J 37/0611 16/355 |
| 1,907,199 A | * | 5/1933 | Hurxthal | A47J 37/0611 219/512 |
| RE18,923 E | * | 8/1933 | Harris | A47J 37/0821 337/303 |
| 1,947,124 A | * | 2/1934 | Clauss | A47J 37/0611 425/188 |
| 2,009,790 A | * | 7/1935 | Shroyer | A47J 37/0688 219/450.1 |
| 2,026,286 A | * | 12/1935 | Samuels | A47J 36/02 99/372 |
| 2,036,523 A | * | 4/1936 | Freemon | A47J 37/00 219/452.13 |
| 2,474,995 A | * | 7/1949 | Wade | A47G 19/02 220/23.8 |
| 2,570,374 A | * | 10/1951 | Pompa | A47J 37/1295 99/416 |
| 2,627,222 A | * | 2/1953 | Luna | A47J 43/20 99/403 |
| 2,635,528 A | * | 4/1953 | Torres | A47J 37/1295 99/413 |
| 2,652,766 A | * | 9/1953 | Cralle | A47J 37/0611 99/349 |
| 2,655,687 A | * | 10/1953 | Miller | A47J 37/0611 16/371 |
| 2,664,812 A | * | 1/1954 | Molina | A47J 37/1295 249/120 |
| 2,734,983 A | * | 2/1956 | Krichton | A47J 37/0611 219/448.17 |
| 2,743,665 A | * | 5/1956 | Gustafson | A47J 37/0611 99/331 |
| 2,775,929 A | * | 1/1957 | Johnson | A47J 43/18 294/104 |
| 2,778,294 A | * | 1/1957 | Ulloa | A47J 43/18 414/586 |
| 2,792,774 A | * | 5/1957 | Veach | A47J 37/1295 99/426 |
| 2,814,981 A | * | 12/1957 | Wendel | A47J 37/1295 99/426 |
| 2,847,933 A | * | 8/1958 | Pate | A47J 37/1295 24/327 |
| 2,891,814 A | * | 6/1959 | Idoine | A47J 43/283 294/106 |
| 2,957,404 A | * | 10/1960 | Richardson | A47J 37/1295 99/426 |
| 2,957,405 A | * | 10/1960 | Maldonado | A47J 37/1295 249/120 |
| 3,020,826 A | * | 2/1962 | Silva | A47J 37/1295 24/551 |
| 3,068,779 A | * | 12/1962 | Eidlisz | A47J 36/08 210/477 |
| 3,207,059 A | * | 9/1965 | Hirons | A47J 37/0694 16/373 |
| D202,960 S | * | 11/1965 | Carpenter | A47J 37/0694 D7/352 |
| 3,511,172 A | * | 5/1970 | Jones | A47J 43/18 249/120 |
| 3,555,993 A | * | 1/1971 | Garcia | A47J 37/0694 99/416 |
| 3,596,822 A | * | 8/1971 | Holley | B65D 43/162 206/303 |
| 3,604,342 A | * | 9/1971 | Harding | A47J 37/1295 99/426 |
| D223,006 S | * | 2/1972 | Price | A47J 37/0694 D7/352 |
| 3,653,337 A | * | 4/1972 | Hanson | A47J 37/1295 425/394 |
| 3,693,537 A | * | 9/1972 | Johnson | A47J 43/18 99/426 |
| 3,745,911 A | * | 7/1973 | Kennedy, Jr. | A47J 43/18 99/426 |
| 3,759,165 A | * | 9/1973 | Wallace | A47J 43/18 99/409 |
| 3,763,764 A | * | 10/1973 | Schy | A47J 37/1214 99/353 |
| 3,799,047 A | * | 3/1974 | Freeman | A47J 37/0611 99/332 |
| 3,817,163 A | * | 6/1974 | Kizziar | A47J 43/18 99/353 |
| D237,935 S | * | 12/1975 | Nygren | A47J 37/0694 99/372 |
| 4,091,720 A | | 5/1978 | Wheeler | |
| D249,219 S | * | 9/1978 | Stence | A47J 37/0694 99/426 |
| 4,154,155 A | * | 5/1979 | Brignall | A47J 37/1295 99/426 |
| 4,154,156 A | * | 5/1979 | Brignall | A47J 37/1295 99/426 |
| 4,173,926 A | * | 11/1979 | Brignall | A47J 37/1295 294/99.2 |
| 4,181,073 A | * | 1/1980 | Chapa, Sr. | A47J 37/1295 99/416 |
| 4,386,557 A | * | 6/1983 | Meraj | A47J 37/0611 219/450.1 |
| 4,476,379 A | * | 10/1984 | Andrizzi | A47J 37/0611 219/386 |
| 4,489,632 A | | 12/1984 | Albrecht et al. | |
| 4,494,453 A | * | 1/1985 | Bentson | A47J 37/1295 425/398 |
| 4,494,454 A | * | 1/1985 | Sparks | A21B 5/02 249/175 |
| 4,517,887 A | * | 5/1985 | Childress | A47J 37/1295 99/426 |
| 4,535,688 A | * | 8/1985 | Bentson | A47J 37/1295 425/398 |
| 4,554,865 A | * | 11/1985 | Caridis | A47J 37/1214 99/353 |
| D281,942 S | * | 12/1985 | Bentson | A47J 37/0694 D7/674 |
| 4,729,589 A | * | 3/1988 | Puskar | A47J 43/28 294/26.5 |
| 4,750,414 A | * | 6/1988 | Dohrs | A47J 37/0694 211/204 |
| 4,773,316 A | * | 9/1988 | Dougherty | A47J 37/1295 99/397 |
| D299,300 S | * | 1/1989 | Lie | A47J 37/0694 D7/361 |
| 4,803,918 A | * | 2/1989 | Carbon | A47J 37/0611 219/524 |
| 4,854,227 A | * | 8/1989 | Koopman | A47J 37/1295 211/181.1 |
| 4,903,923 A | * | 2/1990 | Krentel | A47F 5/13 248/151 |
| D310,946 S | * | 10/1990 | White | A47J 37/0694 D7/683 |
| D326,592 S | * | 6/1992 | Denton | A47J 37/0694 D7/504 |
| D330,149 S | * | 10/1992 | Weimer | A47J 37/0694 D7/672 |
| 5,236,727 A | * | 8/1993 | Huston | A21D 13/0074 426/138 |
| 5,299,492 A | * | 4/1994 | Carbon | A21B 5/023 219/524 |
| 5,400,704 A | * | 3/1995 | Huston | A21D 8/06 219/729 |
| 5,628,245 A | * | 5/1997 | Baze | A47J 37/01 249/120 |

(56) References Cited

U.S. PATENT DOCUMENTS

| | | | | |
|---|---|---|---|---|
| 5,671,658 | A | 9/1997 | Macasaet | |
| D392,153 | S * | 3/1998 | Wright | A47J 37/0694 D7/410 |
| 5,937,742 | A * | 8/1999 | Steeb | A47J 37/0611 99/375 |
| 5,937,743 | A * | 8/1999 | Overstreet | A47J 37/1295 99/353 |
| 5,983,784 | A * | 11/1999 | Goldberg | A47J 37/0611 99/372 |
| 5,988,048 | A * | 11/1999 | Hunter | A23L 1/005 99/413 |
| 6,027,753 | A * | 2/2000 | Reeves | A21D 13/0035 426/144 |
| 6,397,730 | B1 | 6/2002 | Steinbach et al. | |
| 6,412,400 | B1 * | 7/2002 | Gambino | A47J 37/0611 99/372 |
| 6,427,581 | B1 * | 8/2002 | Wu | A47J 37/0611 99/331 |
| 6,658,992 | B2 * | 12/2003 | Zelander | A21B 3/18 99/353 |
| 6,860,191 | B2 * | 3/2005 | Jackson | A47J 37/0611 99/340 |
| D503,593 | S * | 4/2005 | Walker | A47J 37/0694 D7/672 |
| D543,073 | S * | 5/2007 | Rich | A47J 37/0694 D7/410 |
| 7,441,496 | B2 | 10/2008 | Romano | |
| D589,294 | S * | 3/2009 | Averty | A47J 37/0694 D7/356 |
| D595,326 | S | 6/2009 | Geidel | |
| 7,543,530 | B2 * | 6/2009 | Cohn | A23L 1/0107 99/403 |
| 7,638,740 | B1 | 12/2009 | Hradecky | |
| 7,752,958 | B2 | 7/2010 | Cohen et al. | |
| 7,866,257 | B2 * | 1/2011 | Vasquez | A47J 37/1295 99/426 |
| D643,678 | S * | 8/2011 | Lavy | A47J 37/0694 D7/352 |
| 7,989,012 | B2 * | 8/2011 | Gambino | A47J 36/02 219/621 |
| 8,061,268 | B1 * | 11/2011 | McGuinness | A47J 36/027 99/422 |
| 8,151,696 | B2 * | 4/2012 | Lubowicki | A47J 36/38 99/375 |
| D696,058 | S * | 12/2013 | Crockett, Jr. | A47J 37/0694 D7/354 |
| 8,692,164 | B2 * | 4/2014 | Krishnan | A47J 37/0611 219/450.1 |
| D730,118 | S * | 5/2015 | Fast | A47J 37/0694 D7/352 |
| 9,186,021 | B1 * | 11/2015 | Dover | A47J 37/1295 |
| D755,010 | S * | 5/2016 | Wu | A47J 37/0694 D7/352 |
| 2004/0182256 | A1 * | 9/2004 | Losoya | A47J 37/1295 99/426 |
| 2004/0187708 | A1 * | 9/2004 | Waldstrom | A23G 9/28 99/455 |
| 2004/0263077 | A1 * | 12/2004 | Kao | H01J 9/242 313/582 |
| 2005/0217492 | A1 * | 10/2005 | Albritton | A47J 37/0611 99/372 |
| 2005/0223907 | A1 * | 10/2005 | Albritton | A47J 37/0611 99/372 |
| 2005/0223908 | A1 * | 10/2005 | Albritton | A47J 37/0611 99/372 |
| 2005/0271982 | A1 * | 12/2005 | Setsuda | H01J 9/242 430/321 |
| 2006/0027555 | A1 * | 2/2006 | Aisenbrey | A47J 37/0611 219/385 |
| 2006/0117963 | A1 * | 6/2006 | Schneider | A47J 37/1295 99/403 |
| 2006/0147587 | A1 * | 7/2006 | Kovich | A21C 15/025 426/138 |
| 2006/0201333 | A1 * | 9/2006 | Friel, Sr. | G05D 23/1951 99/372 |
| 2006/0283334 | A1 | 12/2006 | Ho | |
| 2007/0157823 | A1 | 7/2007 | Cohen et al. | |
| 2008/0014324 | A1 * | 1/2008 | Darnell | A21D 13/0074 426/549 |
| 2008/0105137 | A1 | 5/2008 | Genslak | |
| 2008/0175959 | A1 * | 7/2008 | Hill | A23L 1/0005 426/90 |
| 2008/0245241 | A1 * | 10/2008 | Rosset | A21B 5/023 99/375 |
| 2009/0145307 | A1 * | 6/2009 | Lubowicki | A47J 37/0611 99/375 |
| 2010/0005975 | A1 | 1/2010 | Mitchell | |
| 2011/0126720 | A1 * | 6/2011 | Galvin | A47J 37/0611 99/378 |

OTHER PUBLICATIONS http://bruxie.com/frequently-asked-questions/.
http://www.waffleandwolf.com/.
http://www.ideann.com/3in1-sandwich-panini-and-waffle-press.html.
http://www.wafflesandwichmaker.com/.
http://www.swiss-miss.com/2007/05/they_keyboard_w.html.
http://www.bizrate.com/waffle-makers/sandwich-waffle-maker/.

* cited by examiner

WAFFLE IRON PLATE

BACKGROUND OF THE INVENTION

Incorporation by Reference

Applicant(s) hereby incorporate herein by reference any and all U.S. patents and U.S. patent applications cited or referred to in this application.

Field of the Invention

Aspects of this invention relate generally to waffle plate, and more particularly to new and improved waffle iron plates.

Description of Related Art

As is known in the art, a waffle iron is a cooking appliance used to make waffles. Most waffle irons generally comprise two hinged plates, each being formed with a grid pattern of bumps and recesses designed to form the typical honeycomb waffle. The plates are then connected to an electrical source for selectively heating each plate. Accordingly, each plate is typically made of iron or some other heat conductive material, often with a non-stick coating or other surface treatment. Once the waffle iron is heated, batter is poured between the plates, and the plates are closed together to cook or bake the waffle.

Oftentimes, each waffle iron plate is configured to form multiple waffles, usually two or four, with a scored area between each of the waffles for easy separation after the waffles are cooked. Each score may be formed by a single pair of ribs, one on each of the respective two plates and so configured to be adjacent when the plates are brought together for cooking the waffles. In other designs, each waffle iron plate is configured to form a single waffle, most often having either a square or round shape, in which case there are typically no scores because there are no waffles to separate after cooking.

Recently waffles have been folded substantially in half as a means of holding food or other savory items. However, current waffle configurations are not made to be folded and subsequently the waffle breaks and/or falls apart when taken by customers to consume. This creates an unpleasant and frustrating experience for the customer and materially prevents a viable business model as the types of foods held by the waffle are limited by the waffle design. The invention described herein resolves these problems and allows for the introduction of a variety of new offerings to consumers in which foods not normally associated with waffles can be combined and presented in an easy to consume and handle from that does not break.

Aspects of the present invention fulfill these needs and provide further related advantages as described in the following summary.

SUMMARY OF THE INVENTION

Aspects of the present invention teach certain benefits in construction and use which give rise to the exemplary advantages described below.

In an exemplary embodiment, a waffle iron plate according to aspects of the invention is configured for forming a waffle having multiple scores, the plate comprising a base having a front surface and at least two spaced-apart ribs extending from the front surface of the base and configured to form the scores, whereby the waffle may be folded along the scores so as to have a bottom portion and two side portions.

A primary objective inherent in the above-described plate and method of use is to provide advantages not taught by the prior art.

Another objective is to provide such a plate that is configured to form a waffle that is selectively foldable.

Another objective is to provide such a plate that allows for a waffle that is pliable and affords a unique crispness.

Another objective is to provide such a plate that makes waffles that are more conducive to holding a variety of food contents.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting. To accomplish the above and related objects, this invention may be embodied in the form illustrated in the accompanying drawings, attention being called to the fact, however, that the drawings are illustrative only, and that changes may be made in the specific construction illustrated.

DETAILED DESCRIPTION OF THE INVENTION

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claims are set forth below in a certain combination, it must be expressly understood that the invention includes other combinations of fewer, more of different elements, which are disclosed herein even when not initially claimed in such combinations.

The above-described drawing figures illustrate aspects of the invention in at least one of its exemplary embodiments, which are further defined in detail in the following description.

Figure 1:
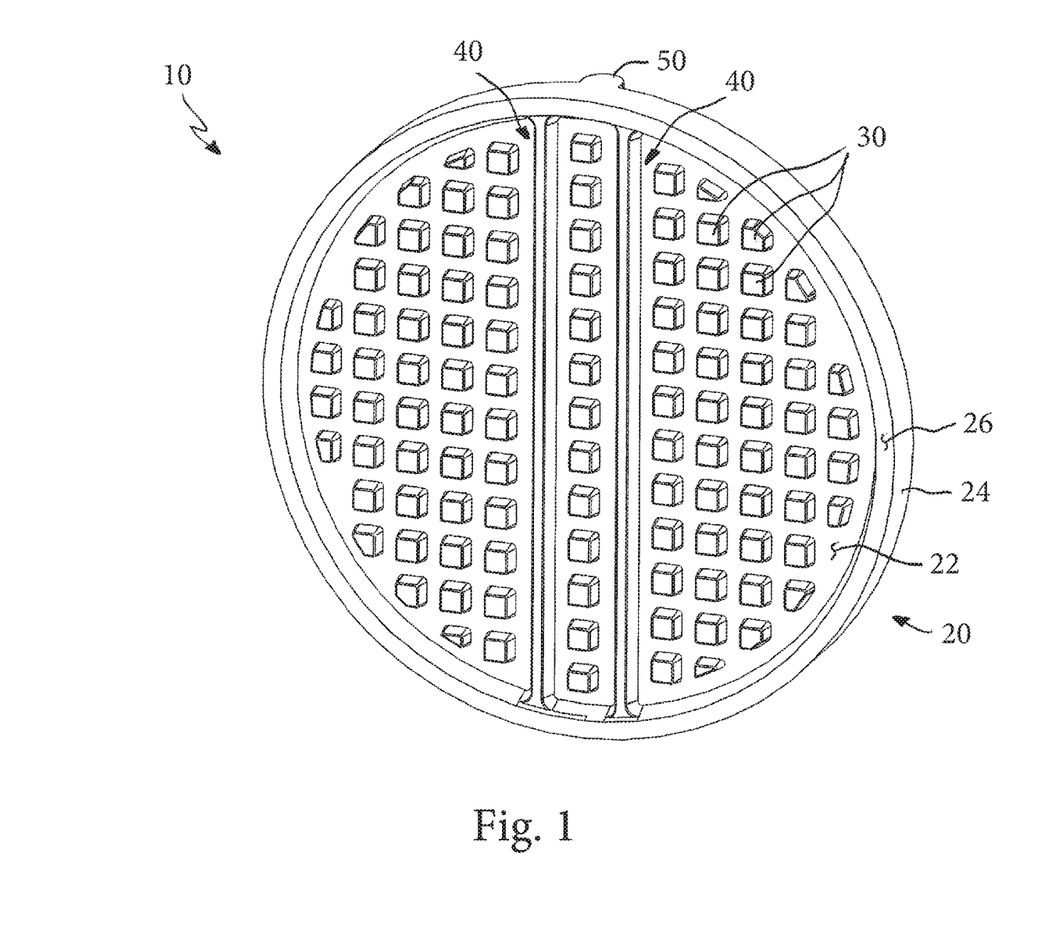
FIG. 1 is a perspective view of an exemplary embodiment of the invention.

Referring first to FIG. 1, there is shown a perspective view of an exemplary waffle iron plate 10 according to aspects of the present invention. While a particular grid pattern is shown as being formed by substantially square, spaced-apart bumps 30 and respective spaces therebetween, it will be appreciated that such grid pattern is merely illustrative and that the invention is not so limited. Similarly, the overall shape of the plate 10 shown as being round is also to be understood as merely exemplary and non-limiting, as is the substantially planar configuration of the plate, it being appreciated that the plate in whole or in part may also be curved. In addition, although the inventor describes the invention as a waffle iron plate, one can appreciate that any heat conductive material that have similar characteristics as iron can be used as the plate material.

In the exemplary embodiment, the waffle iron plate 10 generally comprises a base 20 having a front surface 22 and an outer wall 24 extending out away from a plane defined by the front surface of the base 20 substantially about its perimeter and terminating in a front perimeter edge 26 configured for engaging an opposite plate (not shown) when operably installed in a waffle iron appliance (not shown). Along the base 20 in a substantially repeating pattern as bounded by the outer wall 24 there are again formed extending substantially outwardly from the front surface 22 spaced-apart bumps 30, in the exemplary embodiment being substantially square in profile, except that in locations adjacent the outer wall 24 such bumps may be truncated in a manner known in the art to yield a substantially uniform recess channel between the resulting grid pattern of bumps 30 and the outer wall 24. Both the bumps 30 and the outer wall 24 may be formed with vertical walls extending from the base 20 that are tapered so as to facilitate removal of the cooked waffle 90 (FIG. 6) in a manner known in the art.

Figure 2:
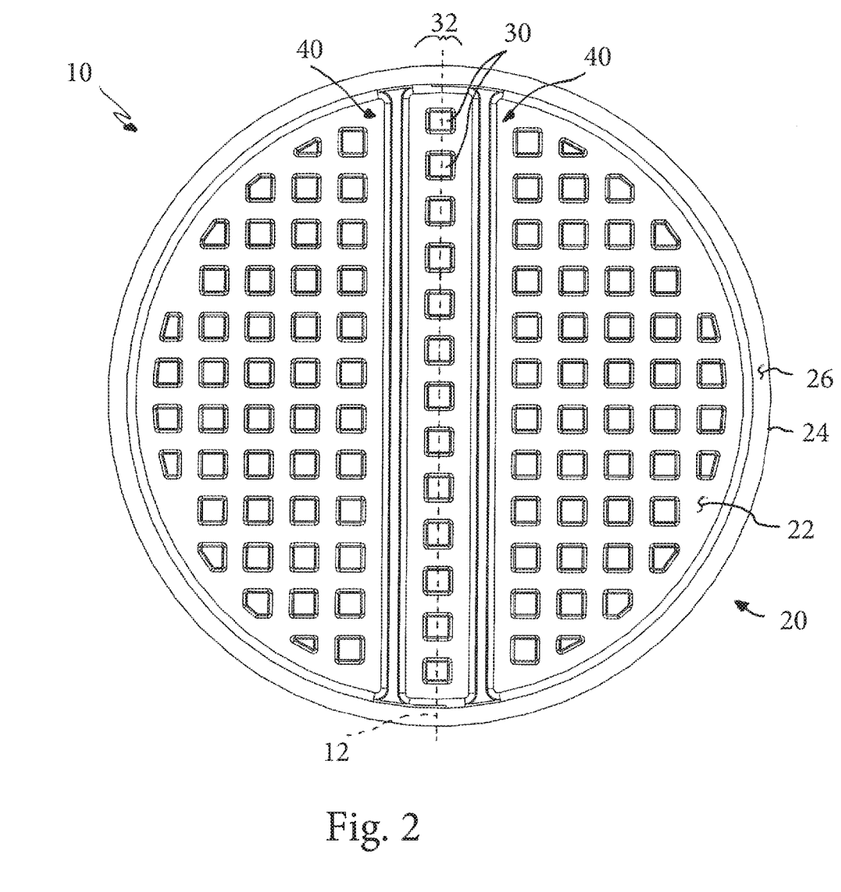
FIG. 2 is a front view thereof.

With reference now to FIGS. 1 and 2, two spaced-apart and substantially parallel ribs 40 are formed so as to also extend from the front surface 22 of the base 20 within the grid pattern of bumps 30. The ribs 40 are depicted extending out away from the plane defined by the front surface 22 and terminating closer to the front surface 22 than a front perimeter edge 26 of the outer wall 24. In the exemplary embodiment, the ribs 40 are equidistant from the centerline 12 of the circular waffle iron plate 10 and span the distance from one side of the plate 10 to the other, thereby intersecting the outer wall 24 at opposite ends and bounding therebetween one row 32 of bumps 30. It will be appreciated by those skilled in the art that when two such plates 10 are then brought together to form a waffle 90 (FIGS. 6 and 7), the ribs 40 on opposite plates 10 being thus adjacent and being sized and configured to allow the flow of batter therebetween thus serve to form parallel "relief scores" in the resulting waffle 90 that facilitate folding of the cooked waffle 90, as explained in further detail below in connection with FIGS. 6 and 7. It is to be understood that while a particular size and shape of waffle iron plate 10 and resulting waffle 90 are shown, the invention is not so limited. Rather, a variety of configurations of the waffle iron plate beyond that shown are possible without departing from the spirit and scope of the invention. For example, the ribs 40 may be configured to not connect with the outer wall 24, may be closer together so as to not have any bumps 30 therebetween or may be further apart and have two or more rows of bumps 30 therebetween, may be formed to not be equidistant from the centerline 12 or not be parallel to each other, or may be discontinuous so as to effectively form a perforated or undulating score in the finished waffle 90, any and all such variations thus enabling configurations of the cooked and folded waffle 90 different from that shown in FIG. 7. Moreover, while two ribs 40 are shown and described in the exemplary embodiment, it will be appreciated that other quantities, spacing, and configurations of the ribs may be employed in the present invention as well. Again, those skilled in the art will appreciate that such variations are possible in the present invention without departing from its spirit and scope.

Figure 3:
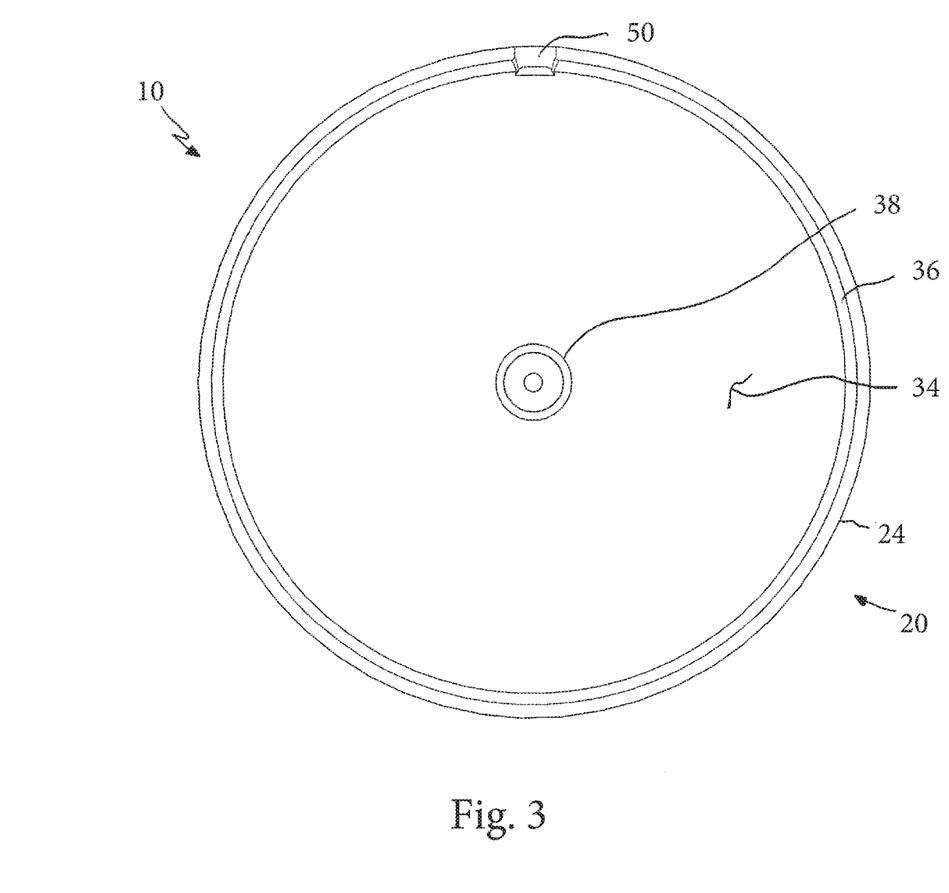
FIG. 3 is a back view thereof.
Figure 4:
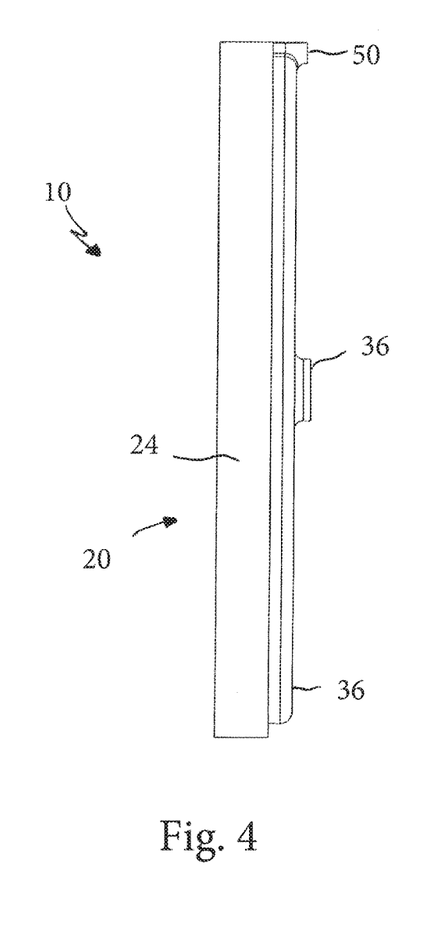
FIG. 4 is a side view thereof.
Figure 5:
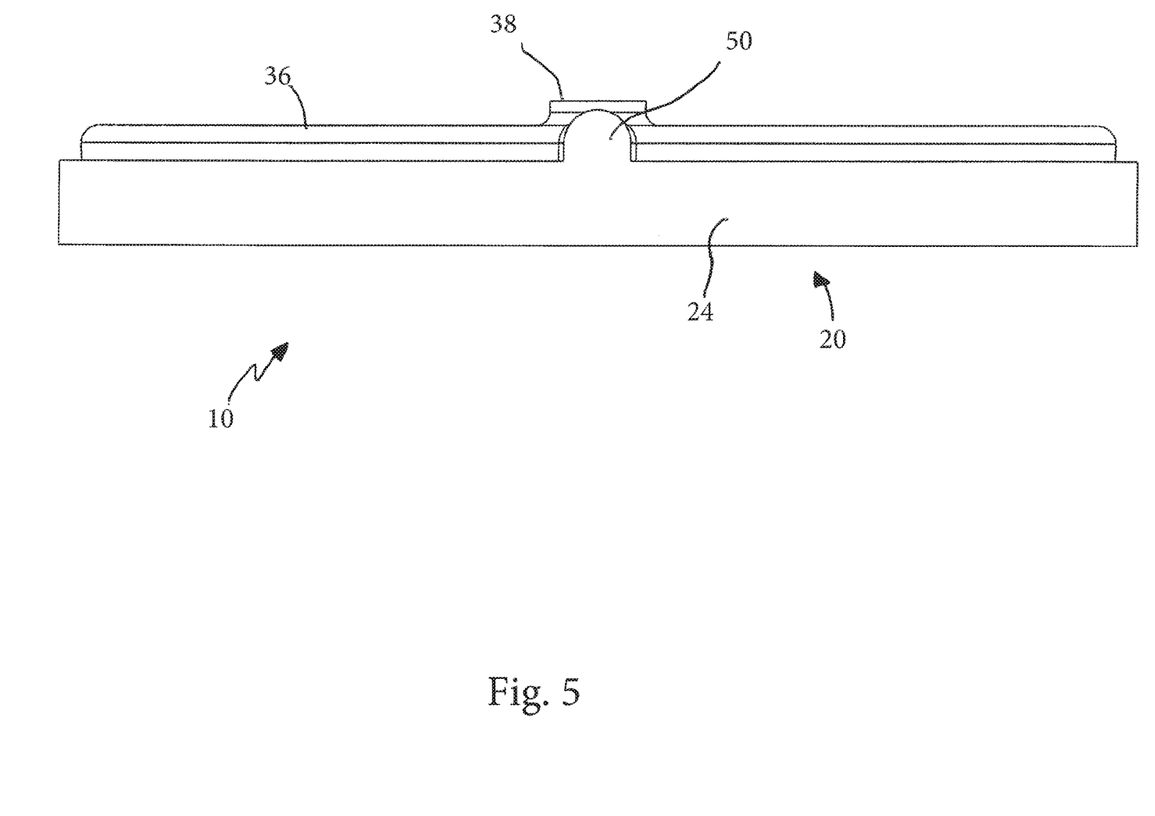
FIG. 5 is an enlarged top view thereof.

Turning now to FIGS. 3-5, showing back, side, and top views of the exemplary waffle iron plate 10, it can be seen that the outer wall 24, or the base 20 more generally, may be formed with an indexing feature 50 configured to engage a corresponding notch or other feature in the waffle iron itself (not shown) such that when the plate 10 is installed the orientation of particularly the ribs 40 relative to any such waffle iron is assured. It will be appreciated by those skilled in the art that by forming such an indexing feature 50 on each such plate 10, the plates will be capable of being installed in a given waffle iron in a common orientation, whereby the ribs 40 of the respective plates are properly aligned so as to form the relief scores 92 in each waffle 90 (FIG. 6) as described above and further below. While the indexing feature 50 is shown as being a single somewhat rounded protrusion extending from the outer wall 24 opposite the front perimeter edge 26, it will be further appreciated that any feature or features by which the respective plate 10 may be indexed or keyed to a waffle iron in which it is installed may be employed.

Finally, with reference to particularly FIG. 3, the waffle iron plate 10 is shown as having a flange 36 substantially about the perimeter of the back surface 34. Furthermore, the plate 10 is also shown as being formed on its back surface 34 with a central boss 38 that extends from the base 20 substantially opposite the bumps 30 and ribs 40 formed on the front surface 22. Any such structure on the back surface 34 as needed for operation of the waffle iron plates 10 in conjunction with a particular waffle iron, whether now known or later developed, may be employed in the present invention without departing from its spirit and scope.

Figure 6:
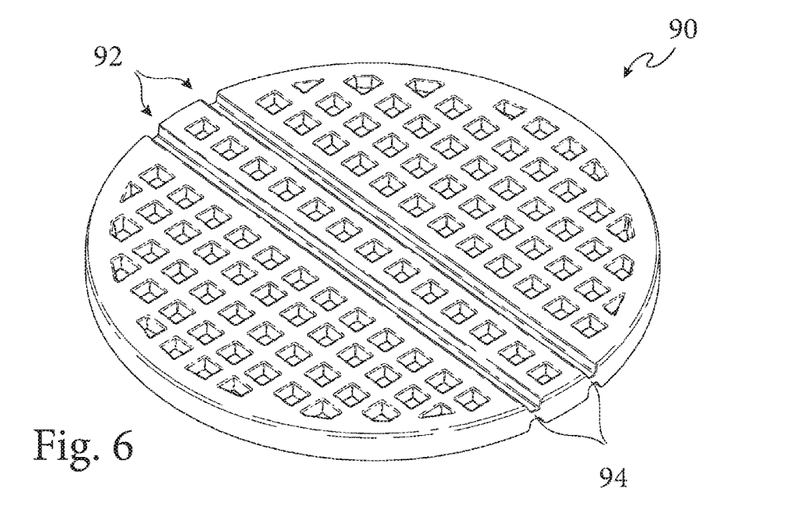
FIG. 6 is a perspective view of an exemplary embodiment of a waffle produced in accordance with the exemplary embodiment shown in FIGS. 1-5.
Figures 7, 8:
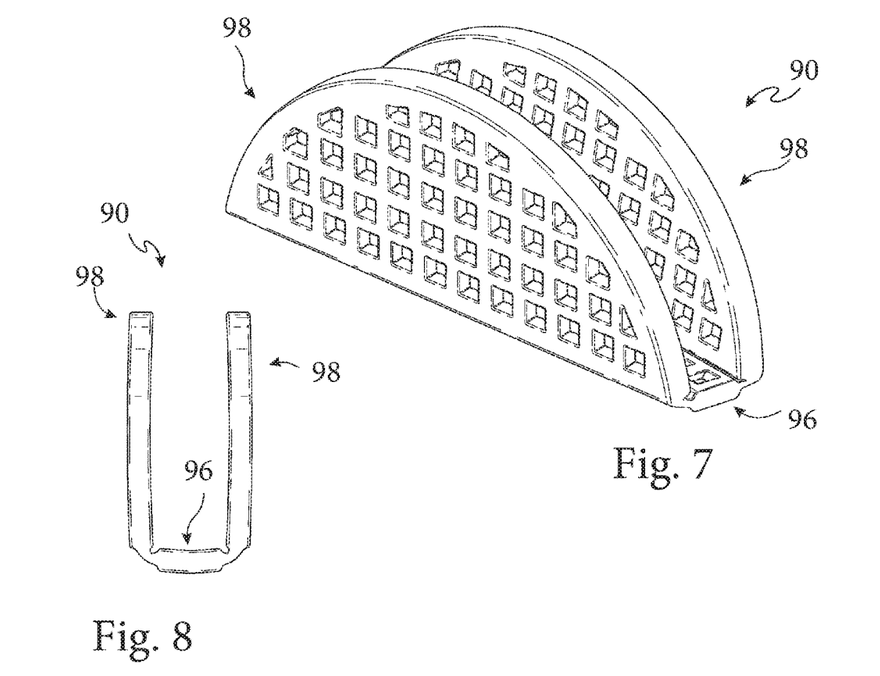
FIG. 7 is a perspective view of the waffle of FIG. 6 now in a folded configuration.
FIG. 8 is a front view of the waffle of FIG. 6 in a folded configuration.

In use, two waffle iron plates according to aspects of the present invention, such as the exemplary plate 10 shown in FIGS. 1-5 as described above, are installed within a waffle iron (not shown), with the indexing feature 50 on each plate 10 again serving to properly orient the plates within the iron. Each such plate 10 is also configured for receipt of electrical power in any manner now known or later developed for the purpose of heating up and cooking waffle batter to form a waffle. Referring now to FIG. 6, it will be appreciated by those skilled in the art that when batter (not shown) is poured between the two plates 10 so configured and operably installed within a waffle iron appliance and the plates 10 are then brought together to form a waffle 90, the ribs 40 on opposite plates thereby being brought substantially adjacent and being sized and configured to allow the flow of batter therebetween thus serve to form parallel relief scores 92 in the resulting waffle 90, while the batter also flows around the pattern of bumps 30 in a manner known in the art to form the basic honeycomb waffle configuration. It will be further appreciated that the relief scores 92 serve to form spaced-apart, parallel living hinges 94 that allow the cooked waffle 90, once removed from the plate 10, to be folded in the two locations as shown in FIG. 7. The resulting folded waffle 90 has a substantially planar bottom portion 96 between the two scores 92 and two substantially planar side portions 98 extending from the respective scores 92 substantially perpendicular to the bottom portion 96, the bottom and side portions 96, 98 cooperating for improved retention of food or other savory items (not shown) within the folded waffle 90. In the exemplary embodiment, the waffle bottom portion 96 is relatively smaller than the respective two waffle side portions 98, though it will again be appreciated that the locations of the relief scores 92 as dictated by the ribs 40 formed on the plate 10 may vary, and thus the proportionality of the bottom and side portions 96, 98 of the waffle 90, without departing from the spirit and scope of the invention. It will be further appreciated that the height of the ribs 40 defines the depth of the scores 92 and thus the thickness of the living hinges 94 of the final cooked waffle 90, which also may be varied depending on the type of batter, the intended use and overall design of the waffle, and other such factors, with an objective being that the folded waffle 90 be relatively resistant to tearing along the hinges 94 during use. Once more, those skilled in the art will appreciate that while a particular size and shape of waffle iron plate 10 and resulting waffle 90 are shown, the invention is not so limited. Rather, a variety of configurations of the waffle iron plate beyond that shown are possible without departing from the spirit and scope of the invention.

The incorporation of ribs 40 and relief scores 92 in combination with the arrangement of the bumps 30 results in a folded waffle 90 that is more pliable and contains a unique crispness not before achievable in the known industry. Such resulting folded waffle 90 improves the user's experience and satisfaction when holding food and eating food contained in the folded waffle 90. In addition, the addition of ribs 40 and relief scores 92 may lower the folded waffle 90 production time by reducing the number of bumps 30 required on the waffle plate thereby improving the speed and efficiency for the operators to produce more folded waffles 90 in a given time.

As shown in FIG. 8, the substantially planar bottom 96 allows an improved area to hold a variety of food and the two hinges 94 increases the pliability and durability of the overall waffle 90.

It should be noted that the various features of each above-described embodiment may be combined in any logical manner and are intended to be included within the scope of the present invention. It will also be appreciated by those skilled in the art that the present invention is not limited to the particular geometries and materials of construction disclosed, but may instead entail other functionally comparable structure, now known or later developed, without departing from the spirit and scope of the invention. Furthermore, while aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A waffle iron plate comprising:
   a base having a front surface;
   an outer wall extending out away from a plane defined by the front surface and having a first height relative to the front surface, and the outer wall extending away from a perimeter of the base, wherein the outer wall is uninterrupted along the perimeter of the base such that the outer wall forms an outer boundary of a waffle-forming space of the waffle iron plate;
   at least two spaced-apart ribs extending substantially parallel to one another and out away from the plane defined by the front surface in the same direction as the outer wall and terminating closer to the front surface than a front perimeter edge of the outer wall such that each of the two spaced-apart ribs has a second height relative to the front surface, wherein the second height is smaller than the first height, wherein each of the two spaced-apart ribs extends continuously from a first end to a second end, wherein the first end intersects the outer wall at a first location and the second end intersects the outer wall at a second location, the two spaced-apart ribs dividing the waffle-forming space into a bottom-forming portion between the two spaced-apart ribs and a pair of side-forming portions on opposing sides of the two spaced-apart ribs that correspond, respectively, to a bottom portion and two side portions of a waffle formed by the waffle iron plate;
   a plurality of bumps extending from the front surface of the base within each of the bottom-forming portion and the side-forming portions;
   wherein the at least two spaced-apart ribs are configured such that a maximum dimension in a first direction of each of the pair of side-forming portions is greater than a maximum dimension in the first direction of the bottom-forming portion, and wherein the first direction is perpendicular to the two spaced-apart ribs;
   wherein a difference between the first height of the outer wall and the second height of the two spaced apart ribs is configured to form a pair of scores in the waffle whereby the waffle may be folded along the scores so as to have the two side portions extend upwardly from the bottom portion;
   an indexing feature, wherein the indexing feature is formed so as to protrude from an outer wall formed about the perimeter of the base;
   a perimeter flange and a central boss extending from a back surface of the base substantially opposite the front surface.

2. The waffle iron plate of claim 1 wherein the ribs are substantially equidistant from a centerline of the plate.

3. The waffle iron plate of claim 1 wherein the two spaced-apart ribs bound therebetween a single row of the plurality of bumps.

4. The waffle iron plate of claim 3, wherein each of the pair of side portions of the front surface comprises at least five rows of bumps extending in a direction parallel to the two spaced-apart ribs.

5. A waffle plate for forming a waffle having multiple scores, the plate comprising:
   a base having a front surface;
   an outer wall extending out away from a plane defined by the front surface and having a first height relative to the front surface, and the outer wall extending away from a perimeter of the base, wherein the outer wall is uninterrupted along the perimeter of the base such that the outer wall forms an outer boundary of a waffle-forming space of the waffle iron plate;

a plurality of bumps extending from the front surface of the base; and a pair of spaced-apart parallel ribs extending out away from the plane defined by the front surface of the base in the same direction as the outer wall, the pair of spaced-apart parallel ribs being located within the plurality of bumps equidistant from a centerline of the plate, each of the pair of spaced-apart parallel ribs being continuous within the waffle-forming space and each end of each of the pair of spaced-apart parallel ribs intersecting the outer wall to divide the waffle-forming space into a bottom-forming portion between the pair of spaced-apart ribs and a pair of side-forming portions on opposing sides of the pair of spaced-apart ribs, wherein each of the pair of spaced-apart ribs has a second height relative to the front surface, wherein the second height is smaller than the first height, wherein the pair of spaced-apart ribs bound therebetween a single row of bumps and wherein a difference between the first height of the outer wall and the second height of the pair of spaced-apart ribs is configured to form two scores in a waffle formed by the waffle plate in use, whereby the waffle may be folded along the scores so as to have a bottom portion and two relatively larger side portions.

6. The waffle iron plate of claim 5 being comprised of iron.

7. The waffle iron plate of claim 5 wherein the base and the pair of spaced-apart parallel ribs are configured to provide the waffle with the bottom portion that is flat.

8. The waffle iron plate of claim 5 wherein the base, the pair of spaced-apart parallel ribs, and the plurality of bumps are configured to provide the waffle having an improved retention of a variety of food.

9. A waffle iron plate comprising:
a base having a front surface;
an outer wall extending out away from a plane defined by the front surface and having a first height relative to the front surface, and the outer wall extending away from a perimeter of the base, wherein the outer wall is continuous along an entirety of the perimeter of the base such that the outer wall forms a boundary of a single waffle-forming space of the waffle iron plate;
at least two spaced-apart ribs extending out away from the plane defined by the front surface in the same direction as the outer wall and terminating closer to the front surface than a front perimeter edge of the outer wall and having a second height relative to the front surface, wherein the second height is smaller than the first height, each of the two spaced-apart ribs extending continuously from a first end that intersects with the outer wall at a first location to a second end that intersects the outer wall at a second location, the two spaced-apart ribs dividing the waffle-forming space into a bottom-forming portion between the spaced-apart ribs and a pair of side-forming portions on opposing sides of the two spaced-apart ribs that correspond, respectively, to a bottom portion and two side portions of a waffle formed by the waffle-forming space of the waffle iron plate, wherein each of the pair of side-forming portions of the front surface of the base is larger than the bottom-forming portion of the front surface of the base; and
a plurality of bumps extending from the front surface of the base within each of the bottom-forming portion and the side-forming portions;
wherein a difference between the first height of the outer wall and the second height of the at least two spaced apart ribs is configured in use to form a pair of scores in the waffle such that the waffle is foldable along the scores to form a substantially planar waffle bottom portion between the scores and two substantially planar waffle side portions extending from the scores substantially perpendicular to the waffle bottom portion.

10. The waffle iron plate of claim 9 being comprised of iron.

11. The waffle iron plate of claim 9 wherein the base and the pair of spaced-apart parallel ribs are configured to provide the waffle with the bottom portion that is flat.

12. The waffle iron plate of claim 9 wherein the base and the pair of spaced-apart parallel ribs are configured to provide the waffle having an improved retention of a variety of food.

13. A waffle iron plate comprising:
a base having a front surface;
an outer wall extending out away from a plane defined by the front surface and having a first height relative to the front surface, and the outer wall extending away from a perimeter of the base, wherein the outer wall is uninterrupted along the perimeter of the base such that the outer wall forms a boundary of a waffle-forming space of the waffle iron plate;
at least two spaced-apart ribs extending out away from the plane defined by the front surface in the same direction as the outer wall and terminating closer to the front surface than a front perimeter edge of the outer wall and having a second height relative to the front surface, wherein the second height is smaller than the first height and a difference between the first height of the outer wall and the second height of the at least two spaced-apart ribs is configured to form in use a waffle having scores, whereby the waffle may be folded along the scores so as to have a bottom portion and two side portions that correspond, respectively, to an intermediate portion of the front surface between the two spaced-apart ribs and a pair of outer portions on each side of the two spaced-apart ribs, wherein each of the pair of outer portions is larger than the intermediate portion, each of the two spaced-apart ribs extending continuously from a first end to a second end, each of the first end and the second end intersecting the outer wall such that the scores extend continuously through the waffle; and
a plurality of bumps extending from the front surface of the base, wherein the at least two spaced apart ribs are formed within the plurality of bumps so as to bound therebetween a single row of bumps.

14. The waffle iron plate of claim 13, wherein each of the pair of outer portions of the front surface comprises at least five rows of bumps extending in a direction parallel to the two spaced-apart ribs.

* * * * *